US012697648B2

(12) United States Patent
Wang et al.

(10) Patent No.: US 12,697,648 B2
(45) Date of Patent: Aug. 4, 2026

(54) PROCESS FOR PRODUCING HEAVY-METAL-MEDIATED BIOCHAR COMPLEX CURED BY USING SILICATE

(71) Applicant: CHINESE RESEARCH ACADEMY OF ENVIRONMENTAL SCIENCES, Beijing (CN)

(72) Inventors: Lei Wang, Beijing (CN); Beidou Xi, Beijing (CN); Xiaoshu Wang, Beijing (CN); Nan Xu, Beijing (CN); Yan Shao, Beijing (CN); Shaofeng Li, Beijing (CN); Yangyang Wang, Beijing (CN); Jinsheng Wang, Beijing (CN); Ming Chang, Beijing (CN); Gen Zhang, Beijing (CN); Lulu Pan, Beijing (CN); Honghu Zeng, Beijing (CN); Bo Yang, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 492 days.

(21) Appl. No.: 18/549,903

(22) PCT Filed: Mar. 3, 2022

(86) PCT No.: PCT/CN2022/079113
§ 371 (c)(1),
(2) Date: Sep. 9, 2023

(87) PCT Pub. No.: WO2022/199351
PCT Pub. Date: Sep. 29, 2022

(65) Prior Publication Data
US 2024/0157415 A1      May 16, 2024

(30) Foreign Application Priority Data

Mar. 26, 2021     (CN) ......................... 202110326967.9

(51) Int. Cl.
*B09B 3/40*          (2022.01)
*B09B 3/25*          (2022.01)
(52) U.S. Cl.
CPC .  *B09B 3/40* (2022.01); *B09B 3/25* (2022.01)
(58) Field of Classification Search
CPC .... B09B 3/40; B09B 3/25; B09B 3/21; B09B 3/00; B09B 5/00
See application file for complete search history.

(56) References Cited

FOREIGN PATENT DOCUMENTS

| CN | 103464101 A | * | 12/2013 | |
| CN | 104399222 A | * | 3/2015 | ............... A62D 3/33 |
| CN | 111196931 A | * | 5/2020 | ............ C10B 53/00 |
| CN | 111821946 A | * | 10/2020 | ............... B09C 1/00 |

OTHER PUBLICATIONS

Lee et al. In situ stabilization of cadmium-, lead-, and zinc-contaminated soil using various amendments. Chemosphere</i>, 2009, <b>77(8),</b> pp. 1069-1075. (Year: 2009).*

Ramola et al. Improved lead removal from aqueous solution using novel porous bentonite- and calcite-biochar composite. Science of the Total Environment</i>, 2019, <b>709</b>, 126171. (Year: 2019).*

Ali et al. Application of Floating Aquatic Plants in Phytoremediation of Heavy Metals Polluted Water: A Review. MDPI Sustainability, </i> 2020, <b>12</b>, 1927. (Year: 2020).*

Yoon et al. Synthesis of functionalised biochar using red mud, lignin, and carbon dioxide as raw materials. Chemical Engineering Journal</i>, 2019, <b>361</b>, pp. 1597-1604. (Year: 2019).*

Zhao et al. Copyrolysis of Biomass with Phosphate Fertilizers to Improve Biochar Carbon Retention, Slow Nutrient Release, and Stabilize Heavy Metals in Soil. ACS Sustainable Chem. Eng. </i>2016, <b>4, 3,</b> pp. 1630-1636. (Year: 2016).*

Adinehvand et al. Acid-treated zeolite (clinoptilolite) and its potential to zinc removal from water sample. Int. J. Environ. Sci. Technol., 2016, 13, pp. 2705-2712. (Year: 2016).*

* cited by examiner

*Primary Examiner* — Christina A Johnson
*Assistant Examiner* — Mordecai M Leavitt
(74) *Attorney, Agent, or Firm* — CBM PATENT CONSULTING, LLC

(57)          ABSTRACT

A process for producing a heavy metal mediated biochar composite using silicate solidification. *Hydrocharis dubia* has excellent enrichment of manganese ions in sewage, and is used to treat sewage water to adsorb heavy metals such as lead, manganese and zinc contained in the sewage water into roots, stems and leaves thereof, which are pyrolysed in stages at high temperature with activated red mud and bentonite prior to blending with zeolites, to produce said heavy metal mediated biochar composite; the process significantly extends the migration time of heavy metals, increases the stability of heavy metals and reduces the risk of environmental pollution by heavy metal leakage.

8 Claims, No Drawings

PROCESS FOR PRODUCING HEAVY-METAL-MEDIATED BIOCHAR COMPLEX CURED BY USING SILICATE

TECHNICAL FIELD

The present invention relates to the field of environmental manufacturing technology and specifically relates to a process for the production of heavy metal mediated biochar.

BACKGROUND ART

Heavy metal pollution is mainly divided into natural and man-made. Natural activities include volcano activities and forest fires etc., whereas man-made factors are mainly industrial production, for example, significant amounts of heavy metals contained in sour waste water generated by machinery industry, and significant amounts of sewage discharged by mining and metallurgical industries. Other artifacts include emission of car exhaust, abuse of pesticide fertilizers, casual disposal of domestic waste, etc., leaching of these pollutants through atmospheric precipitation, heavily contaminating soil, surface water, and groundwater.

After heavy metals enter water bodies, they are difficult to degrade, pass through food chain and enter organisms, making metabolic activities impossible to perform properly, severely affecting human health and disrupting ecological environment.

Plant repair technologies are widely used in recent years, enriching large amounts of heavy metals in contaminated sites with plant matter, reducing environmental risks to the soils, and these heavy metal-contaminated plants are both "sinks" of pollutants. It is also a "source" of pollution. There are studies that heavy metals can accumulate in plant bodies and their seeds with enhanced biological effectiveness, and these heavy metals cannot be degraded by the plant bodies, causing secondary pollution to soil and groundwater once the heavy metals in the plants are released back into the environment.

Scientific disposal of phytoremediation-generated biomass is an important foundation for further development of phytoremediation technologies. Disposition studies on contaminated biomass are subject to following three principles: to thoroughly solve the waste accumulation problem, cheap and easy to operate, and to recover valuable products as much as possible. In order to achieve de-quantitation, harmless disposal and reuse of phytoremediation products, current methods for the disposal of phytoremediation products borrow solid waste disposal techniques: compressed land-filling, liquid phase extraction, composting, incineration, etc. But the biochar or biomass obtained as a result of such techniques remains at risk of heavy metal release during constant aging.

For above reasons, there is great need to find disposal method that stably solidifies biomass enriched with heavy metals.

SUMMARY OF THE INVENTION

In order to overcome the above problems, the present inventors have conducted research on existing heavy metal enriched biomass and methods for treating the same, and a process for producing a heavy metal mediated biochar composites using silicate solidification is investigated. *Hydrocharis dubia* has excellent enrichment of manganese ions in sewage, and is used to treat sewage water to adsorb heavy metals such as lead, manganese and zinc contained in the sewage water into roots, stems and leaves thereof, which are pyrolysed in stages at high temperature with activated red mud and bentonite prior to blending with zeolites, to produce said heavy metal mediated biochar composite. The process of the present invention significantly extends the migration time of heavy metals, increases the stability of heavy metals. The using of red mud is in line with the notion of "Green Development", thereby completing the present invention.

In particular, it is an object of the present invention to provide the following aspects: In one aspect, there is provided a process for producing a heavy metal mediated biochar composite, in which the process comprises:

Step 1, preparing a heavy metal-based biomass;

Step 2, pyrolyzing said heavy metal-based biomass produced in step 1 together with a silicate-containing composite.

In another aspect, there is provided a heavy metal mediated biochar composite produced by the process according to the first aspect.

Beneficial effects of the present invention include:

(1) The process provided according to the invention for producing heavy metal mediated biochar composite, extends the migration time of the heavy metal and improves the stability of the heavy metal.

(2) The process provided according to the invention for producing heavy metal mediated biochar composite, heavy metals, such as lead, manganese and zinc are loaded by staged pyrolysis into the biochar composite, by which reduces the dissolution rate of heavy metals such as lead, manganese and zinc, and the hazard to the environment.

(3) The process provided according to the invention for producing heavy metal mediated biochar composite, utilizes red mud to reject the waste, which is blended with bentonite, zeolite into the biochar composite to improve water retention of the biochar composite.

DETAILED DESCRIPTION OF INVENTION

The present invention will be described in more detail through embodiments and examples. Through these descriptions, the features and advantages of the present invention will become clearer.

The term "exemplary" as used herein is intended to be "serving as an example, an illustrative embodiment, or an embodiment". Any of the embodiment(s) described herein as "exemplary" need not be construed as preferred as or better than other embodiment(s).

In one aspect of the invention, there is provided a process for producing a heavy metal-mediated biochar composite using silicate solidification, and the process comprising:

Step 1, the Preparation of a Heavy Metal-Based Biomass.

With economic development, the process of industrialization is more and more rapid, industrial development of pollutants such as heavy metals is rapid, more and more wastewater and municipal sewage or sewage water are discharged into natural water bodies, severe contamination of rivers, lakes, poise and groundwater bodies. With the development and advancement of the national and world industries, the yield of heavy metals is also higher and higher, if not controlled, the hazard it poses to the environment will not be estimated. In the present invention, aquatic plants are selected to enrich heavy metals in contaminated water, and then aquatic plants containing heavy metals are dried and pyrolysed to obtain biochar composite, therefore stably coating or enriching heavy metals in the pyrolysed biochar composite, extending the migration time of heavy metals and avoiding secondary contamination of water bodies by heavy metals.

In the present invention, the aquatic plant includes any one or more of emergent plants, floating leaf plants, submerged plants, floating plants, preferably submerged plant, such as bitter grass, *Hydrocharis dubia, Potamogeton malaianus*, etc., more preferably *Hydrocharis dubia*.

According to the present invention, the aquatic plant is less affected by natural factors such as weather and does not occupy scarce terrestrial resources, in particular the growing environment such that the aquatic plant itself already has an abundant pore structure supporting its respiration, works well for heavy metal absorption and has clear advantages in the production of biochar materials.

In the present invention, the bulky root beetle of *Potamogeton malaianus* is constantly absorbing contaminants in the water, and the surprising rate of reproduction results in the prohibitive ability to purify the water quality, allowing the adsorption of large amounts of toxic heavy metals such as manganese and zinc from the sewage water.

According to the present invention, aquatic plants absorb heavy metal elements in sewage during growth, in situ enrichment in the tissues of aquatic plants, the heavy metal elements in the biochar produced do not agglomerate, prolonging the migration time of the heavy metals. However, the adsorption capacity of aquatic plants for heavy metals is limited and different heavy metals may be competing, resulting in differences in the effects of the aquatic plants adsorbing heavy metals.

Further, in order for the aquatic plant to absorb more heavy metal elements, the inventors have found that, heavy metals such as lead, manganese and zinc can be absorbed and enriched simultaneously by aquatic plants, in particular *Potamogeton malaianus*, in high amounts. Normal growth of the aquatic plants is not affected when the concentration of lead elements in the sewage is 100-400 mg/L, that of manganese elements is 400-800 mg/L and that of zinc elements is 200-600 mg/L, and a high enrichment of heavy metals in the sewage can be achieved.

In further preferred embodiment, sewage water has elemental concentration of lead between 150 and 300 mg/L, elemental concentration of manganese between 450 and 700 mg/L, and elemental concentration of zinc between 300 and 500 mg/L.

In even further preferred embodiment, sewage water has elemental concentration of lead in range of 250 to 290 mg/L, elemental concentration of manganese in range of 550 to 600 mg/L, and elemental concentration of zinc in range of 400 to 430 mg/L.

According to the present invention, aquatic plants are grown in sewage water and enriched with heavy metals such as lead, manganese, zinc. In order to avoid death of aquatic plants due to excessive enrichment of heavy metals, aquatic plants should be timely got out of water, to avoid death of aquatic plants and secondary contamination of water bodies by decay. Thus, the growth cycle of aquatic plants is no more than 60 days, preferably 20 to 50 days, more preferably 25 to 30 days.

The present inventors have found that different amounts of adsorption to roots, stems and leaves of aquatic plants are different at different concentrations of heavy metal content, and overall, higher amounts of adsorption to heavy metals and maximum biomass are also achieved at roots of aquatic plants. But it is preferred to take the aquatic plant as a whole as biomass in the pyrolysis reaction to avoid secondary contamination of heavy metals.

In the present invention, the aquatic plants are pre-dried and re-pyrolysed to avoid excessive moisture contained in the aquatic plants, affecting the porosity of the biochar and in turn the stability of the biochar.

According to the present invention, the drying temperature is from 80 to 160° C., preferably from 100 to 130° C., more preferably from 105 to 110° C.; the drying time is 0.5 to 5 h, preferably 1 to 3 h, more preferably 2 to 2.5 h.

According to the present invention, the dried heavy metal-based biomass is preferably crushed to a particle size of 100 to 300 m, preferably 120 to 200 m, more preferably 140 to 160 m, since the heavy metal-based biomass that has not been crushed is bulky to disfavor the pyrolysis reaction.

Step 2, Pyrolysis of Said Heavy Metal-Based Biomass Produced in Step 1 Together with a Silicate-Containing Composite.

In step 2, said silicate-containing composite comprises any one or more of red mud, bentonite, chitosan, peat, preferably red mud and bentonite are used together to modify heavy metal-based biochar.

It is worth considering that China is the world's largest alumina producer, red mud is a solid pulverulent waste discharged from the industrial production of alumina smelters. Large amounts of red mud in the world today are disposed of using marine discharge and land impactment. Due to the high alkalinity and high production of red mud, conventional treatments will cause severe pollution of surrounding bodies of water, atmosphere, soil, and yards requiring significant money and large areas of agricultural fields, treatment disposal and integrated use of red mud has become a significant environmental concern of social concern.

In the present invention, red mud is previously treated and used for compounding with biochar, both to reject the waste and to improve the stability of the heavy metals contained in the biochar composite.

In preferred embodiment, red mud is mixed with said heavy metal-based biomass obtained from drying in step 1 by stirring for 2 to 12 h, and then is activated by oven drying at 60 to 200° C., thereafter is grounded and sieved through 60 to 120 mesh screen for use.

In further preferred embodiment, red mud is previously stirred with said heavy metal-based biomass obtained from drying in step 1 for 5 to 8 h, and then is oven-activated at 80 to 150° C., thereafter is milled and sieved through 70 to 100 mesh screen for use.

In further preferred embodiment, red mud is previously stirred with said heavy metal-based biomass obtained from drying in step 1 for 6 h, followed by oven-drying activation at 100 to 110° C., and then being milled and sieved through 80 mesh screen for use.

According to the present invention, the bentonite is very hygroscopic and has a certain viscosity, thixotropy and lubricity, has a strong cation exchange capacity and adsorption capacity, which is advantageous for improving the water retention of the biochar composite.

In order to homogeneously mix the heavy metal-based biomass with the silicate-containing composite and thereby stably enrich more heavy metal in the biochar composite according to the present invention, preferably a mixture of ground-sieved red mud and said heavy metal-based biomass is added to bentonite with some moisture and stirred.

According to the invention, the bentonite has water content of 30 to 60%, preferably 40 to 50%, preferably 43 to 45%; and the stirring time is from 10 to 48 h, preferably from 18 to 36 h, more preferably from 24 to 26 h.

According to the invention, the dry weight ratio of the heavy metal-based biomass, red mud and bentonite is 1:(0.2-5):(0.1-3), preferably 1:(1-3):(0.5-2), more preferably 1:(2-2.5):(1-1.5).

In the present invention, the stability of the biochar composite is improved as the red mud and bentonite content increases. When the heavy metal-based biomass, red mud and bentonite weight ratio is 1:(0.2-5):(0.1-3), in particular 1:(2-2.5):(1-1.5), the prepared biochar composite has best stability, strongest ability to stabilize heavy metals, and lowest dissolution rate of heavy metals.

According to the invention, the pyrolysis is completed in three stages:

First stage: the pyrolysis temperature is 200-350° C., the heating rate is 6-12° C./min, and the holding time is 0.5-2 h;

Second stage: the pyrolysis temperature is 360-450° C., the heating rate is 7-13° C./min, and the holding time is 0.5-3 h;

Third stage: the pyrolysis temperature is 460-600° C., the heating rate is 5-10° C./min, and the holding time is 1-4 h.

In the present invention, the stability and mechanics of the biochar composite are enhanced, the porosity thereof is enhanced, the water retention of the biochar composite is enhanced, the migration time of the heavy metal is extended, and the dissolution rate of the heavy metal is reduced by means of the pyrolysis in stages.

The inventors found that bentonite pyrolyzes even at high temperature 700-800° C., the layered structure remains intact to enhance the mechanical properties of the biochar composite, but too high a temperature results in a reduction in carbon element content of the biochar composite, too much ash, a reduction in the mechanics of the matrix of the biochar composite, i.e. the biochar of aquatic plant pyrolysis, and a reduction in the specific surface area.

It can be seen that the pyrolysis temperature has an important impact on biochar composite performance, specifically:

With increasing pyrolysis temperature, the biochar increases in specific surface area, total pore volume, and micropore volume, as the temperature continues to increase, the structure of branched carbon atoms in the biochar breaks and the reaction continues to generate micropores while some micropores expand into mesopores or even macropores with a concomitant collapse of the micropore walls resulting in a slight decrease in micropore volume; increased temperature, resulting in increased content of inorganic salt crystals such as aluminosilicates in red mud and bentonite, forms irregular particles on the surface of the biochar, increasing heterogeneity of the biochar; again due to good stability of heavy metals, entering into the gas phase under a high temperature environment to coat or enrich the biochar surface is therefore advantageous to enhance the stabilization of heavy metals in the biochar composite, when staged pyrolysis of the mixture of heavy metal-based aquatic plants, red mud and bentonite is advantageous to obtain a biochar composite with higher temperature and mechanical properties.

In a further study, the present inventors have found that the mechanical strength of the biochar composite firstly increases and then decreases. It is preferred that the heating rate of first stage is 3-12° C./min, the heating rate of second stage is 7-13° C./min, and the heating rate of third stage is 5-10° C./min.

In a further preferred embodiment, the pyrolysis is completed in three stages:

First stage: the pyrolysis temperature is 250-300° C., the heating rate is 8-10° C./min, and the holding time 0.8-1.5 h;

Second stage: the pyrolysis temperature is 380-430° C., the heating rate is 9-12° C./min, and the holding time is 1-2 h;

Third stage: the pyrolysis temperature is 500-550° C., the heating rate is 7-9° C./min, and the holding time is 1.5-3 h.

In an even further preferred embodiment, the pyrolysis is completed in three stages:

First stage: the pyrolysis temperature is 290-320° C., the heating rate is 9° C./min, and the holding time is 1.2 h;

Second stage: the pyrolysis temperature is 400-410° C., the heating rate is 10° C./min, and the holding time 1.5 h;

Third stage: the pyrolysis temperature is 510-530° C., the heating rate is 8° C./min, and the holding time is 2 h.

Optionally, the pyrolysis product of step 2 is mixed with zeolites, to increase water retention of biochar composite.

In the present invention, zeolite is aluminosilicate present in tetrahedral stereostructure and its porous structural characteristics give it excellent catalytic, ion-exchange and adsorption properties, mixing zeolite with product obtained from step 2 is advantageous to improve the stability of pyrolysis product of step 2.

In the present invention, the particle size of zeolite is 0.18 to 1.5 mm, preferably 0.22 to 1 mm, more preferably 0.3 to 0.55 mm.

In preferred embodiment, zeolite is modified with strong acid to remove impurities and dust in pores of zeolite prior to mixing with pyrolysis product of step 2.

Said strong acid comprises organic acid and inorganic acid, preferably inorganic acid such as hydrochloric acid, concentrated sulfuric acid and like, more preferably hydrochloric acid.

According to the present invention, the strong acid has a pH of 0 to 4, preferably 1 to 2, more preferably 1.

According to the invention, the modification time is from 5 to 24 h, preferably from 8 to 16 h, more preferably from 10 to 12 h.

According to the present invention, the zeolite comprises 20 to 60%, preferably 30 to 50%, more preferably 40% by weight of the pyrolysis product obtained in step 2.

In another aspect of the invention, there is provided a heavy metal mediated biochar complex produced by the process of the first aspect.

EXAMPLES

The invention is further described below by way of specific examples, which are, however, merely illustrative and do not constitute any limitation on the scope of protection of the invention.

Example 1

(1) ½ Hoagland nutrient solution and trace elements solution is placed in an incubator, and *Hydrocharis dubia* is planted in the incubator. After one week, a solution of lead nitrate with the elemental concentration of lead of 260 mg/L, a solution of manganese chloride with the elemental concentration of manganese of 580 mg/L and a solution of zinc sulfate heptahydrate with the elemental concentration of zinc of 420 mg/L are added in the incubator to simulate contaminated water. After 30 days of cultivation, the roots, stems and leaves of the *Hydrocharis dubia* are collected, dried at 105° C. for 2 h, and pulverized to a particle size of 160 μm, to obtain a heavy metal-based biomass.

Wherein, the trace elements solution has compositions as follows: potassium iodide: 0.83 mg/L, boric acid: 6.2 mg/L, manganese sulfate: 22.3 mg/L, zinc sulfate: 8.6 mg/L, sodium molybdate: 0.25 mg/L, copper sulfate: 0.025 mg/L, cobalt chloride: 0.025 mg/L.

(2) Heavy metal-based biomass, red mud and bentonite in a weight ratio (dry weight) of 1:2:1.2 is subjected to the following:

The heavy metal-based biomass prepared in step (1) is added into red mud, obtained from Samsung Aluminium GmbH, mixed and stirred for 6 h, oven-dried at 100° C., milled and sieved through 80 mesh sieve.

The above mixture of red mud and heavy metal-based biomass is added to bentonite with a water content of 45%, stirred for 24 h, and pyrolysed in three stages, respectively:

First stage: the pyrolysis temperature is 300° C., the heating rate is 9° C./min, and the holding time is 1.2 h;

Second stage: the pyrolysis temperature is 400° C., the heating rate is 10° C./min, and the holding time is 1.5 h;

Third stage: the pyrolysis temperature is 520° C., the heating rate is 8° C./min, and the holding time is 2 h.

(3) Zeolite with particle size of 0.3 mm is modified in HCl with a concentration of 1 mol/L for 12 h, washed 3 times with water and dried at 100° C. in holding environment.

(4) The modified zeolites from step (3) are mixed with the pyrolysis product of step (2) to yield biochar composite, wherein the weight of zeolites is 40% that of the pyrolysis product of step (2).

EXPERIMENTAL EXAMPLES

Experimental Example 1

Reference "Microwave Digestion Method for Total Soil Heavy Metals (HJ832-2017)", 0.400 g of the biochar composite prepared in Example 1 is accurately weighed and placed in a polytetrafluoroethylene digestion tank, 18 mL of concentrated nitric acid and 6 mL of concentrated HCl are added, allowed to react upon standing for 12 h, and then are put into a microwave digester for digestion, to obtain a digestion liquor. After completion of digestion, the digestion liquor is transferred to a 250 mL volumetric flask, brought to volume up to the mark, shaken well and then passed through a 0.45 μm water-based filtration membrane. The contents of the heavy metals: lead, manganese and zinc are measured by ICP-OES, converted to the content of the heavy metals in the biochar composite, namely: a total enrichment of 18 mg/g for lead, 112 mg/g for manganese, and 38 mg/g for zinc.

Experimental Example 2

Reference Environmental Protection Standard "Solid Waste Leaching Toxic Leaching Method (HJ 557-2009)", 0.4 g of the biochar composite of Example 1 is weighed and placed in a 500 mL Erlenmeyer flask, 200 mL of deionized water is added. The finish is sealed with parafilm, and the Erlenmeyer flask is placed in a thermostat and shaken at 25° C. for 8 h with a frequency of 110/min. After completion of the shaking, leaving to stand for 16 h, the supernatant is taken out and brought to a volume of 200 mL, and then passed through a 0.45 μm water-based filtration membrane.

The contents of Pb, Mn and Zn elements in the filtrate are measured by ICP-OES, and the results are shown in Table 1:

TABLE 1

| content and dissolution rate of heavy metals in biochar composite | | | | | |
|---|---|---|---|---|---|
| | Sample | | | | |
| | $Pb^{2+}$ | | $Mn^{2+}$ | | $Zn^{2+}$ | |
| | Dis-solution Con-cen-tration (mg/g) | Dis-solu-tion rate (%) | Dis-solution Con-cen-tration (mg/g) | Dis-solu-tion rate (%) | Dis-solution Con-cen-tration (mg/g) | Dis-solution rate (%) |
| Example 1 | 0.149 | 0.83 | 1.355 | 1.21 | 0.386 | 0.97 |

Experimental Example 3

0.400 g of the biochar composite of Example 1 is weighed and placed in a 500 mL Erlenmeyer flask, and 200 mL of a solution having a pH of 6.0, 8.0, or 10.0 (adjusted with HCl and NaOH) is added respectively. The Erlenmeyer flasks is placed in a thermostat and shaken at 25° C. for 8 h with a frequency of 200/min. After completion of the shaking, leaving to stand for 16 h, the supernatant is taken out and brought to a volume of 200 mL, and then passed through a 0.45 μm water-based filtration membrane. The contents of Pb, Mn and Zn elements in the filtrate are measured by ICP-OES, and the results are shown in Table 2:

TABLE 2

| content and dissolution rate of heavy metals in biochar composite | | | | | | |
|---|---|---|---|---|---|---|
| | $Pb^{2+}$ | | $Mn^{2+}$ | | $Zn^{2+}$ | |
| pH | Dis-solution Concen-tration (mg/g) | Dis-solu-tion rate (%) | Dis-solution Concen-tration (mg/g) | Dis-solu-tion rate (%) | Dis-solution Concen-tration (mg/g) | Dis-solu-tion rate (%) |
| 6.0 | 0.176 | 0.98 | 2.609 | 2.33 | 0.391 | 1.03 |
| 8.0 | 0.153 | 0.85 | 2.374 | 2.12 | 0.350 | 0.92 |
| 10.0 | 0.142 | 0.79 | 2.25 | 2.01 | 0.334 | 0.88 |

Experimental Example 4

0.400 g of the biochar composite of Example 1 is weighed and placed in a 500 mL Erlenmeyer flask, 200 mL of a solution of hydrogen peroxide with mass concentration of 5%, 10% or 15% is added respectively. The Erlenmeyer flask is placed in a thermostat and shaken at 25° C. for 8 h with frequency of 200/min. After completion of the shaking, leaving to stand for 16 h, the supernatant is taken out and brought to a volume of 200 mL, and then passed through a 0.45 μm water-based filtration membrane. The contents of Pb, Mn and Zn elements in the filtrate are measured by ICP-OES, and the results are shown in Table 3:

TABLE 3

| content and dissolution rate of heavy metals in biochar composite | | | | | | |
|---|---|---|---|---|---|---|
| | $Pb^{2+}$ | | $Mn^{2+}$ | | $Zn^{2+}$ | |
| Hydrogen peroxide (%) | Dissolution Concentration (mg/g) | Dissolution rate (%) | Dissolution Concentration (mg/g) | Dissolution rate (%) | Dissolution Concentration (mg/g) | Dissolution rate (%) |
| 5 | 0.146 | 0.81 | 2.117 | 1.89 | 0.330 | 0.87 |
| 10 | 0.155 | 0.86 | 2.162 | 1.93 | 0.365 | 0.96 |
| 15 | 0.162 | 0.90 | 2.195 | 1.96 | 0.388 | 1.02 |

The present invention has been described in detail with reference to preferred embodiments and illustrative examples, but these specific embodiments are only illustrative explanations of the invention, should not be construed as limiting the present invention. Various improvements, substitutions or modifications may be made to the technical disclosure and its embodiments without departing from the spirit and scope of protection of the present invention, all falling within the scope of protection of the invention as set forth in the appended claims.

What is claimed is:

1. A process for producing a heavy metal mediated biochar composite, comprising the following steps of:

step 1, preparing a heavy metal-based biomass by enriching an aquatic plant with heavy metals in sewage water; said heavy metal elements comprise lead, manganese and zinc;

step 2, pyrolyzing said heavy metal-based biomass produced in step 1 together with a silicate-containing composite comprising red mud and bentonite to obtain a pyrolysis product, wherein the pyrolyzing is completed in three stages:

first stage: the pyrolysis temperature is 200-350° C., the heating rate is 6-12° C./min, and the holding time is 0.5-2 h;

second stage: the pyrolysis temperature is 360-450° C., the heating rate is 7-13° C./min, and the holding time is 0.5-3 h;

third stage: the pyrolysis temperature is 460-600° C., the heating rate is 5-10° C./min, and the holding time is 1-4 h; and step 3, modifying zeolites with a strong acid, and mixing the modified zeolites with the pyrolysis product of step 2 to yield the heavy metal mediated biochar composite.

2. The process according to claim 1, wherein said aquatic plant includes any one or more of emergent plants, floating leaf plants, submerged plants, and floating plants.

3. The process according to claim 2, wherein submerged plant is one or more selected from the group consisting of bitter grass, *Hydrocharis dubia* and *Potamogeton malaianus*.

4. The process according to claim 2, wherein said aquatic plant enriched with heavy metals is dried at 80-160° C. for 0.5-5 h to obtain said heavy metal-based biomass.

5. The process according to claim 4, wherein in step 1, the concentration of lead is 100-400 mg/L, the concentration of manganese is 400-800 mg/L, and the concentration of zinc is 200-600 mg/L, in said sewage water.

6. The process according to claim 1, wherein a dry weight ratio of said heavy metal-based biomass, said red mud and said bentonite is 1:(0.2-5):(0.1-3).

7. The process according to claim 1, wherein in step 2, said red mud is mixed under stirring with a dried heavy metal-based biomass obtained from step 1 for 2-12 h, and then is activated by oven drying at 60-200° C., thereafter is grounded and sieved through 60-120 mesh screen.

8. The process according to claim 7, wherein in step 2, a mixture of the ground-sieved red mud and said heavy metal-based biomass is added to said bentonite having a water content of 30% to 60%, and stirred for 10 to 48 h.

* * * * *